United States Patent
Chang et al.

(10) Patent No.: US 7,338,428 B2
(45) Date of Patent: Mar. 4, 2008

(54) COMBINATORIAL FLUORESCENT LIBRARY BASED ON THE STYRYL SCAFFOLD

(75) Inventors: Young-Tae Chang, New York, NY (US); Gustavo Rosania, Ann Arbor, MI (US)

(73) Assignee: New York University, New York, NY (US)

( * ) Notice: Subject to any disclaimer, the term of this patent is extended or adjusted under 35 U.S.C. 154(b) by 522 days.

(21) Appl. No.: 10/880,614

(22) Filed: Jul. 1, 2004

(65) Prior Publication Data

US 2005/0054006 A1  Mar. 10, 2005

Related U.S. Application Data (63) Continuation of application No. 10/656,875, filed on Sep. 8, 2003, now abandoned.

(60) Provisional application No. 60/408,882, filed on Sep. 9, 2002.

(51) Int. Cl.
*C40B 40/04* (2006.01)

(52) U.S. Cl. ....................................................... 506/15

(58) Field of Classification Search ..................... None
See application file for complete search history.

(56) References Cited

OTHER PUBLICATIONS

Khersonsky, Sonya M., et al., Facilitated Forward Chemical Genetics Using a Tagged Triazine Library and Zebrafish Embryo Screening, J. Am. Chem. Soc. 2003, Sep. 9, 2003, pp. 11804-11805, vol. 125, No. 39, New York.
Lee, Jae Wook, et al., Development of Novel Cell-Permeable DNA Sensitive Dyes Using Combinatorial Synthesis and Cell-Based Screening, The Royal Society of Chemistry 2003, Jun. 23, 2003, pp. 1852-1853.
Rosania, Gustavo R., et al., Combinational Approach to Organelle-Targeted Fluorescent Library Based on the Styryl Scaffold, J. Am. Chem. Soc. 2003, Jan. 14, 2003, pp. 1130-1131, vol. 125, No. 5, New York.
Uttamchandani, Mahesh, et al., Microarrays of Tagged Combinational Triazine Libraries in the Discovery of Small-Molecule Ligands of Human IgG, Journal of Combinational Chemistry 2004.
Williams, Darren, et al., Identification of Compounds That Bind Mitochondrial F1F0 ATPase by Screening a Triazine Library for Correction of Albinism, Chemistry & Biology, Sep. 2004, pp. 1251-1259, vol. 11.

*Primary Examiner*—J. Douglas Schultz
*Assistant Examiner*—J. S. Lundgren
(74) *Attorney, Agent, or Firm*—Browdy and Neimark, PLLC (57) ABSTRACT

A combinatorial library of fluorescent compounds useful as organelle-specific probes are produced by reacting an aldehyde with a 2- or 4-methylpyridinium salt.

3 Claims, 5 Drawing Sheets

Figure 1. Fluorescent images of representative localizations: Nuclear (H28); mitochondria (A12); nucleolar (I19); reticular (J37); cytosolic (I37); vesicular (H36); granular (B41); multi-labeled: nucleolar (I19, red), granular (G34, blue), mitochondrial (B24, green).

FIGURE 1

Fig.2 Eight selected compounds and related derivatives

Fig. 3. Fluorometric titration of compound 1 with dsDNA in a buffer solution ($\lambda_{ex}$ = 394 nm, compound 1 = 5 µM)

FIGURE 3

Fig. 4 Absorption and Fluorescence spectrum of compound 1, 2, 3 Dye 1, 2, 3 (50 µM), dsDNA (50 µg/mL)

Fig. 5 Nuclear staining of compound 1, 2, and 3 (500 μM)

| Compund | 1 | 2 | 3 |
|---|---|---|---|
| | A | B | C |

FIGURE 5

COMBINATORIAL FLUORESCENT LIBRARY BASED ON THE STYRYL SCAFFOLD

The present application is a continuation of Ser. No. 10/656,875, filed Sep. 8, 2003, and now abandoned, which claims priority from provisional application 60/408,882, filed Sep. 9, 2002.

FIELD OF THE INVENTION

The present invention relates to a combinatorial library of fluorescent compounds based on a styryl backbone and their use as organelle-specific probes.

BACKGROUND OF THE INVENTION

Fluorescent compounds are important compounds because of their broad applications, particularly because of their highly sensitive and specific detection methods (Czarnik, 1992; Rettig et al., 1999; Slavik, 1993; Lakowica, 1999; Herman, 1998). It is desirable to obtain fluorescent compounds that fluoresce in a wide range of colors so that specific compounds can be selected for different purposes. Rational design of compounds with specific emission wavelengths and high quantum yields is difficult.

Combinatorial chemistry is a synthetic strategy that produces diverse, usually large, chemical libraries. It is the systematic and repetitive, covalent connection of a set of different monomeric building blocks of varying structure to each other to produce an array of diverse molecules. It also encompasses other chemical modifications, such as cyclizations, eliminations, cleavages, etc., that are carried out in a manner that generates permutations and thus collections of diverse molecules.

Chemical combinatorial libraries are diverse collections of molecular compounds. These compounds are formed using a multi-step synthetic route wherein a series of different chemical modules can be inserted at any particular step in the route. By performing the synthetic route multiple times in parallel, each possible permutation of the chemical modules can be constructed. The result is the rapid synthesis of hundreds, thousands, or even millions of different structures within a chemical class.

Combinatorial synthetic and screening techniques can identify lead structures from a variety of library compounds, enhancing the success rate in developing useful new compounds while saving much time in trial and error. Following its application in drug discovery, the combinatorial approach now competes with rational design methods in the field of materials science.

A combinatorial approach has been used in developing fluorescent libraries (Seidel et al., 2001; Zhu et al., 2002; Lavastre et al., 2002). However, the spectral properties and potential applications of the reported combinatorial fluorescent libraries are still limited.

SUMMARY OF THE INVENTION

It is an object of the present invention to overcome deficiencies in the prior art.

It is another object of the present invention to produce a library of fluorescent compounds.

It is a further object of the present invention to produce a library of organelle-specific probes.

According to the present invention, a fluorescent library based upon the styryl scaffold is synthesized by condensing an aldehyde with a 2- or 4-methylpyridinium salt as follows:

Scheme 1. Synthesis of styryl dyes wherein R and R$^1$ are each selected from the group consisting of substituted or unsubstituted alkyl, alkenyl, alkynyl, aryl, alkaryl, hetereocyclic, cyclic, and fused aryl compounds, where only one methyl group is on either the 2 or 4-position.

Among the building blocks that can be used for preparing the libraries of the present invention are the following:

Building blocks A

1

2

3

4

-continued

5

6

7

8

9

10

11

12

-continued

13

14

15

16

17

18

19

20

-continued

Building blocks B

A

B

C

D

E

F

G

-continued

H

I

J

K

L

M

N

It can readily be seen that the styryl dye library of the present invention covers a broad range of colors, ranging from blue to long red, representing practically all visible colors. This broad range of colors is attributed of the structural diversity of the dyes.

It is important to note that further purification of the dyes is not required for primary analysis, as the fluorescent properties of the products are easily distinguishable from those of left-over building blocks A and B (weak fluorescence or much shorter $\lambda_{ex}$, and $\lambda_{em}$). The various dyes can readily be screened to determine which dyes are best suited for detecting a specific organelle.

The synthesis of the present invention is such that the reaction mixture can be used directly in biological screening. Toxic catalysts such as strong acids, strong bases, or toxic metals, are not present in the reaction mixture, and most of the low boiling point solvents and catalyst (e.g., pyrrolidine) were removed during microwave reaction, leaving only DMSO, a common solvent for biological sample preparation.

The synthetic compounds selected from the cell screening method exhibit a strong fluorescence increase with the addition of DNA or RNA. The fluorescence compounds will be used as sensing molecules.

BRIEF DESCRIPTION OF THE DRAWINGS

FIG. 1A is nucleolar.

FIG. 1B is nuclear.

FIG. 1C is mitochondrial.

FIG. 1D is cytosolic.

FIG. 1E is vesicular.

FIG. 1F is granular.

FIG. 1G is reticular.

FIG. 1H is multi-labeled.

DETAILED DESCRIPTION OF THE INVENTION

As used herein, alkyl, alkenyl and alkynyl carbon chains, if not specified, contain from 1 to 20 carbon atoms, preferably from 1 to 16 carbon atoms, and are straight or branched. Alkenyl carbon chains of from 1 to 20 carbon atoms preferably contain 1 to 8 double bonds; the alkenyl carbon chains of 1 to 16 carbon atoms preferably contain from 1 to 5 double bonds.

Alkynyl carbon chains of from 1 to 20 carbon atoms preferably contain 1 to 8 triple bonds, and the alkynyl carbon chains of 1 to 16 carbon atoms preferably contain 1 to 5 triple bonds. The alkyl, alkenyl, and alkynyl groups may be optionally substituted, with one or more groups, preferably alkyl group substituents that may be the same or different. As used herein, lower alkyl, lower alkenyl, and lower alkynyl refer to carbon chains having fewer than or equal to about 6 carbon atoms.

As used herein an alkyl group substituent includes halos, haloalkyl, preferably halo lower alkyl, aryl, hydroxy, alkoxy, aryloxy, alkoxy, alkylthio, arylthio, aralkyloxy, aralkylthio, carboxy, alkoxycarbonyl, oxo, and cycloalkyl.

For the present invention, "cyclic" refers to cyclic groups preferably containing from 3 to 19 carbon atoms, preferably 3 to 10 members, more preferably 5 to 7 members. Cyclic groups include hetero atoms, and may include bridged rings, fused rings, either heterocyclic, cyclic, or aryl rings.

The term "aryl" herein refers to aromatic cyclic compounds having up to 10 atoms, including carbon atoms, oxygen atoms, sulfur atoms, selenium atoms, etc. Aryl groups include, but are not limited to, groups such as phenyl, substituted phenyl, naphthyl, substituted naphthyl, in which the substituent is preferably lower alkyl, halogen, or lower alkyl. "Aryl" may also refer to fused rings systems having aromatic unsaturation. The fused ring systems can contain up to about 7 rings.

An "aryl group substituent" as used herein includes alkyl, cycloalkyl, cycloaryl, aryl, heteroaryl, optionally substituted with 1 or more, preferably 1 to 3, substituents selected from halo, haloalkyl, and alkyl, arylalkyl, heteroarylalkyl, alkenyl containing 1 to 2 double bonds, alkynyl containing 1 to 2 triple bonds, halo, hydroxy, polyhaloalkyl, preferably trifluoromethyl, formyl, alkylcarbonyl, arylcarbonyl, optionally substituted with 1 or more, preferably 1 to 3, substituents selected from halo, haloalkyl, alkyl, heteroarylcarbonyl, carboxyl, alkoxycarbonyl, aryloxycarbonyl, aminocarbonyl, alkylaminocarbonyl, dialkylaminocarbonyl, arylalkylaminocarbonyl, alkoxy, aryloxy, perfluoroalkoxy, alkenyloxy, alkynyloxy, arylalkoxy, aminoalkyl, alkylaminoalkyl, dialkylaminoalkyl, arylaminoalkyl, amino, alkylamino, dialkylamino, arylamino, alkylarylamino, alkylcarbonylamino, arylcarbonylamino, amido, nitro, mercapto, alkylthio, arylthio, perfluoroalkylthio, thiocyano, isothiocyano, alkylsufinyl, alkylsulfonyl, arylsulfinyl, arylsulfonyl, aminosulfonyl, alkylaminosulfinyl, dialkylaminosulfonyl, and arylaminosulfonyl.

The term "arylalkyl" as used herein refers to an alkyl group which is substituted with one or more aryl groups. Examples of arylalkyl groups include benzyl, 9-fluorenylmethyl, naphthylmethyl, diphenylmethyl, and triphenylmethyl.

"Cycloalkyl" as used herein refers to a saturated mono- or multicyclic ring system, preferably of 3 to 10 carbon atoms, more preferably from 3 to 6 carbon atoms. Cycloalkenyl and cycloalkynyl refer to mono- or multicyclic ring systems that respectively include at least one double bond and at least one triple bond. Cycloalkenyl and cycloalkynyl groups may preferably contain 3 to 10 carbon atoms, with cycloalkenyl groups more preferably containing 4 to 7 carbon atoms and cycloalkynyl groups more preferably containing 8 to 10 carbon atoms. The ring systems of the cycloalkyl, cycloalkenyl and cycloalkynyl groups may be composed of one ring or two or more rings which may be joined together in a fused, bridged, or spiro-connected fashion, and may be optionally substituted with one or more alkyl group substituents.

The term "heteroaryl" for purposes of the present application refers to a monocyclic or multicyclic ring system, preferably about 5 to about 15 members, in which at least one atom, preferably 1 to 3 atoms, is a heteroatom, that is, an element other than carbon, including nitrogen, oxygen, or sulfur atoms. The heteroaryl may be optionally substituted with one or more, preferably 1 to 3, aryl group substituents. Exemplary heteroaryl groups include, for example, furanyl, thienyl, pyridyl, pyrrolyl, N-methylpyrrolyl, quinolyinyl and isoquinolinyl.

The term "heterocyclic" refers to a monocyclic or multicyclic ring system, preferably of 3 to 10 members, more preferably 4 to 7 members, where one or more, preferably 1 to 3, of the atoms in the ring system is a heteroatom, i.e., an atom that is other than carbon, such as nitrogen, oxygen, or sulfur. The heterocycle may be optionally substituted with one or more, preferably 1 to 3, aryl group substituents. Preferred substituents of the heterocyclic group include hydroxy, alkoxy, halo lower alkyl. The term heterocyclic may include heteroaryl. Exemplary heterocyclics include, for example, pyrrolidinyl, piperidinyl, alkylpiperidinyl, morpholinyl, oxadiazolyl, or triazolyl.

The nomenclature alkyl, alkoxy, carbonyl, etc, is used as is generally understood by those of skilled this art. As used herein, aryl refers to saturated carbon chains that contain one or more carbon atoms; the chains may be straight or branched or include cyclic portions or may be cyclic.

The term "halogen" or "halide" includes F, Cl, Br, and I. This can include pseudohalides, which are anions that behave substantially similarly to halides. These compounds can be used in the same manner and treated in the same manner as halides. Pseudohalides include, but are not limited to, cyanide, cyanate, thiocyanate, selenocyanate, trifluoromethyl, and azide.

The term "haloalkyl" refers to a lower alkyl radical in which one or more of the hydrogen atoms are replaced by halogen, including but not limited to, chloromethyl, trifluoromethyl, 1-chloro-2-fluoroethyl, and the like. "Haloalkoxy" refers to RO— in which R is a haloalkyl group.

The term "sulfinyl" refers to —S(O)—. "sulfonyl" refers to —S(O)$_2$—.

"Aminocarbonyl" refers to —C(O)NH$_2$.

"Alkylene" refers to a straight, branched, or cyclic, preferably straight or branched, bivalent aliphatic hydrocarbon group; preferably having from 1 to about 20 carbon atoms. The alkylene group is optionally substituted with one or more alkyl group substituents. There may be optionally inserted along the alkylene group one or more oxygen, sulfur, or substituted or unsubstituted nitrogen atoms, wherein the nitrogen substituent is alkyl. Exemplary alkylene groups include methylene, ethylene, propylene, cyclohexylene, methylenedioxy, and ethylenedioxy. The term "lower alkylene" refers to alkylene groups having from 1 to 6 carbon atoms. Preferred alkylene groups are lower alkylene, with alkylene of 1 to 3 atoms being particularly preferred.

The term "alkenylene" as used herein refers to a straight, branched or cyclic, preferably straight or branched, bivalent aliphatic hydrocarbon group, preferably having from about 1 to 20 carbon atoms and at least one double bond. The alkenylene group is optionally substituted with one or more alkyl group substituents. There may be optionally inserted along the alkenylene group one or more oxygen, sulfur, or substituted or unsubstituted nitrogen atoms, where the nitrogen substituent is alkyl as previously described.

As used herein, "alkynylene" refers to a straight, branched or cyclic bivalent aliphatic hydrocarbon group having from 1 to about 20 carbon atoms and at least one triple bond. The alkynylene group is optionally substituted with one or more alkyl group substituents. There may be optionally inserted along the alkynylene group one or more oxygen, sulfur, or substituted or unsubstituted nitrogen atoms, where the nitrogen substituent is alkyl. The term "lower alkynylene" refers to alkynylene groups having from 2 to 6 carbon atoms.

The term "arylene" as used herein refers to a monocyclic or polycyclic bivalent aromatic group preferably having from to 20 carbon atoms and at least one aromatic ring. The arylene group is optionally substituted with one or more alkyl group substituents. There may be optionally inserted around the arylene group one or more oxygen, sulfur, or substituted or unsubstitued nitrogen atoms, where the nitrogen substituent is alkyl.

"Heteroarylene" refers to a bivalent monocyclic or multicyclic ring system, preferably of about 5 to about 15 members, wherein one or more of the atoms in the ring system is a heteroatom. The heteroarylene may be optionally substituted with one or more aryl group substituents. As used herein, "alkylidene" refers to a bivalent group, such as =CR'R", which is attached to one atom of another group, forming a double bond. "Arylalkylidene" refers to an alkylidene group in which either R' or R" is an aryl group.

As used herein, when any particular group, such as phenyl or pyridyl, is specified, this means that the group is substituted or unsubstituted. Preferred substituents, where not specified, are halo, halo lower alkyl, and lower alkyl.

The term "library" refers to a collection of diverse compounds, in the present case, based upon a styryl scaffold.

According to the present invention, an aldehyde is reacted with a 2- or 4-methylpyridinium salt in the presence of a secondary amine catalyst in a solvent such as a mixture of DMSO-ethanol. The secondary amine catalysts are exemplified by pyrrolidine or piperidine. However, any secondary amine can be used as a catalyst.

The reaction can be conducted in any suitable solvent, including, but not limited to, DMXO, DMF, dioxane, water, ethanol, methanol, ethyl acetate, and the like. Exogenous heat energy, such as microwave energy, is applied to the system for about 1 to about 60 minutes to form styryl-based fluorescent dyes other types of energy which can be used to heat the system can be used, such as infrared energy, a heat source, or the like.

Table I shows the fluorescence and organelle targeting data for compounds selected from the library.

TABLE 1

The fluorescence and organelle targeting data for the compounds selected from the library

| COMPOUND LABEL | EX/EM PEAK NO. | EX(nm) | EM(nm) | LOCALIZATION NO. | LOCALIZATION |
|---|---|---|---|---|---|
| A1 | 1 | 390 | 490 | 1 | CYTO |
| A5 | 1 | 375 | 540 | | |
| A12 | 1 | 330-460 | 540 | 1 | MITO |
| A13 | 1 | 390 | 550 | | |
| A14 | 1 | 430(broad) | 550 | 1 | MITO |
| A15 | 1 | 390, 420 | 510 | | |
| A16 | 1 | 390-420 | 510 | | |
| A18 | 1 | 420 | 610 | | |
| A19 | 1 | 460 | 600 | 1 | MITO |
| A19 | | | | 2 | NUCLEOLI |
| A22 | 1 | 400 | 540 | | |
| A23 | 1 | 450 (broad) | 540 | 1 | CYTO |
| A23 | | | | 2 | MITO |
| A24 | 1 | 400) | 530 | 1 | CYTO |
| A27 | 1 | 450 | 640 | 1 | CYTO |
| A29 | 1 | 400-420 | 560 | | |
| A30 | 1 | 420-440 | 590 | | |
| A32 | 1 | 400 | 510 | 1 | MITO |
| A32 | | | | 2 | CYTO |
| A32 | | | | 3 | VESICLE |
| A33 | 1 | 360-420 | 600 | | |
| A36 | 1 | 430 | 700 | | |
| A37 | 1 | 460-490 | 580 | | |
| A38 | 1 | 410 | 540 | | |
| A39 | 1 | 430 | 540 | | |
| B1 | 1 | 360-380 | 480 | 1 | CYTO |
| B5 | 1 | 385 | 570 | | |
| B9 | 1 | 390 | 500 | | |
| B11 | 1 | 340-440 | 540 | 1 | MITO |
| B12 | 1 | 340-444 | 530 | 1 | ER |
| B14 | 1 | 360-450 | 550 | 1 | ER |
| B15 | 1 | 390, 420 | 530 | | |
| B16 | 1 | 400 | 590 | 1 | MITO |
| B18 | 1 | 420 | 580 | | |
| B19 | 1 | 380-540 | 610 | 1 | MITO |
| B19 | | | | 2 | ER |
| B21 | 1 | 390 | 540 | | |
| B22 | 1 | 410-420 | 600 | 1 | MITO |
| B23 | 1 | 380-480 | 530 | 1 | CYTO |
| B24 | 1 | 440 | 530 | 1 | MITO |
| B25 | 1 | 430 | 570 | 1 | CYTO |
| B26 | 1 | 420 | 540 | | |
| B27 | 1 | 450(broad) | 630 | 1 | MITO |
| B27 | | | | 2 | ER |
| B29 | 1 | 400-420 | 560 | | |
| B30 | 1 | 430, 450 | 590 | | |
| B31 | 1 | 430 | 580 | 1 | MITO |
| B32 | 1 | 400 | 510 | 1 | MITO |
| B33 | 1 | 350-420 | 500 | 1 | MITO |
| B33 | 2 | 360-400 | 580 | 2 | CYTO |
| B33 | | | | 3 | VESICLE |
| B34 | 1 | 460 | 610 | | |
| B36 | 1 | 420 | 520 | 1 | MITO |
| B37 | 1 | 490, 530(broad) | 700 | 1 | MITO |
| B38 | 1 | 400-480 | 580 | 1 | NUCLEI |
| B38 | | | | 2 | MITO |
| B39 | 1 | 360-440 | 540 | 1 | MITO |
| C12 | 1 | 390 (broad) | 520 | 1 | MITO? |
| C12 | | | | 2 | ER? |
| C13 | 1 | 380 | 540 | | |
| C14 | 1 | 390 | 530 | | |
| C15 | 1 | 390 | 500 | | |
| C19 | 1 | 460 (broad) | 580 | 1 | MITO |
| C23 | 1 | 420 | 530 | 1 | CYTO |
| C27 | 1 | 450 | 620 | | |
| C32 | 1 | 390 | 550 | | |
| C37 | 1 | 520 | 680 | | |
| C38 | 1 | 420 | 580 | | |
| C39 | 1 | 340 | 520 | | |
| H14 | 1 | 420-520 | 590 | 1 | VESICLE |
| H15 | 1 | 420 | 610-620 | 1 | MITO |
| H16 | 1 | 450 | 630 | 1 | NUCLEOLI |
| H17 | 1 | 430 | 650 | 1 | VESICLE |
| H17 | 2 | 420 | 540 | 2 | NUCLEOLI |

TABLE 1-continued

The fluorescence and organelle targeting data for the compounds selected from the library

| COMPOUND LABEL | EX/EM PEAK NO. | EX(nm) | EM(nm) | LOCALIZATION NO. | LOCALIZATION |
|---|---|---|---|---|---|
| H18 | 1 | 430 | 650 | 1 | MITO |
| H18 | | | | 2 | NUCLEOLI |
| H19 | 1 | 490(broad) | 640 | 1 | NUCLEOLI |
| H20 | 1 | 420; 450-530 | 620 | 1 | NUCLEOLI |
| H21 | 1 | 420-550 | 630 | 1 | MITO |
| H21 | | | | 2 | NUCLEOLI |
| H23 | 1 | 420-480 | 580 | 1 | VESICLE |
| H23 | | | | 2 | NUCLEOLI |
| H24 | 1 | 400-500 | 560 | 1 | CYTO |
| H26 | 1 | 530 | 650 | | |
| H27 | 1 | 500(broad) | 620 | 1 | MITO |
| H28 | 1 | 350-500 | 660 | 1 | NUCLEI |
| H31 | 1 | 420 | 610 | 1 | MITO |
| H31 | | | | 2 | NUCLEI |
| H32 | 1 | 420 | 660 | 1 | MITO |
| H32 | | | | 2 | NUCLEOLI |
| H33 | 1 | 340-460 | 620 | 1 | MITO |
| H33 | | | | 2 | NUCLEI |
| H33 | | | | 3 | CYTO |
| H33 | | | | 4 | VESICLE |
| H34 | 1 | 460 | 650 | | |
| H39 | 1 | 530 | 670 | | |
| H39 | 1 | 430(broad) | 560 | 1 | CYTO |
| H41 | 1 | 480 | 640 | | |
| I1 | 1 | 460 | 630 | 1 | MITO |
| I3 | 1 | 480 | 640 | 1 | MITO |
| I4 | 1 | 400(broad) | 620 | 1 | GRANULE |
| I5 | 1 | 420 | 650 | | |
| I10 | 1 | 440, 360 | 520 | 1 | CYTO |
| I10 | 2 | 440, 360 | 640 | 2 | VESICLE |
| I11 | 1 | 430 | 560 | | |
| I12 | 1 | 360, 430 | 560 | 1 | VESICLE |
| I13 | 1 | 430 | 580 | | |
| I14 | 1 | 460 | 580-590 | 1 | VESICLE |
| I15 | 1 | 360 | 520 | | |
| I16 | 1 | 360 | 530/405; 540/488 | 1 | VESICLE |
| I16 | 2 | 360-460 | 610 | 2 | NUCLEOLI |
| I17 | 1 | 360, 430 | 510 | 1 | VESICLE |
| I18 | 1 | 430(broad) | 650 | 1 | NUCLEOLI |
| I19 | 1 | 390; 400-550 | 630 | 1 | NUCLEOLI |
| I20 | 1 | 420(broad) | 620 | 1 | NUCLEOLI |
| I21 | 1 | 390 | 620 | 1 | VESICLE |
| I21 | | | | 2 | NUCLEOLI |
| I22 | 1 | 360 | 510 | | |
| I23 | 1 | 340-360 | 550 | | |
| I24 | 1 | 360 | 530 | | |
| I25 | 1 | 430 | 520 | | |
| I26 | 1 | 360-420 | 630 | | |
| I27 | 1 | 420 | 630-660 | 1 | NUCLEOLI |
| I28 | 1 | 450(broad) | 660 | 1 | NUCLEOLI |
| I29 | 1 | 360, 420 | 580 | | |
| I30 | 1 | 330, 430 | 630 | 1 | MITO |
| I31 | 1 | 380 | 610 | 1 | MITO |
| I31 | | | | 2 | NUCLEI |
| I31 | | | | 3 | CYTO |
| I32 | 1 | 360-440 | 610 | 1 | MITO |
| I32 | | | | 2 | NUCLEI |
| I32 | | | | 3 | NUCLEOLI |
| I33 | 1 | 420 | 640 | 1 | VESICLE |
| I33 | 2 | 320-460 | 560 | 2 | MITO |
| I33 | | | | 3 | NUCLEI |
| I34 | 1 | 490 | 650 | | |
| I35 | 1 | 320-360 | 580 | 1 | CYTO |
| I36 | 1 | 360 | 530 | | |
| I37 | 1 | 530 | 730 | 1 | CYTO |
| C40 | 1 | 390 | 610 | | |
| D23 | 1 | 420(broad) | 510 | 1 | CYTO |
| D37 | 1 | 470(broad) | 650 | 1 | MITO |
| E12 | 1 | 400 | 510 | 1 | VESICLE |
| E12 | | | | 2 | ER |
| E13 | 1 | 380 | 540 | | |
| E19 | 1 | 460(broad) | 580 | 1 | MITO |
| E23 | 1 | 420(broad) | 510 | 1 | CYTO |
| E24 | 1 | 430 | 510 | | |

TABLE 1-continued

The fluorescence and organelle targeting data for the compounds selected from the library

| COMPOUND LABEL | EX/EM PEAK NO. | EX(nm) | EM(nm) | LOCALIZATION NO. | LOCALIZATION |
|---|---|---|---|---|---|
| E27 | 1 | 430 | 620 | | |
| E32 | 1 | 420 | 560 | | |
| E37 | 1 | 520 | 670 | 1 | MITO |
| E37 | | | | 2 | NUCLEOLI |
| E38 | 1 | 430 | 560 | | |
| E39 | 1 | 390-420 (broad) | 500 | | |
| E40 | 1 | 390 | 610 | | |
| F9 | 1 | 400 | 520 | | |
| F10 | 1 | 460 | 520 | | |
| F16 | 1 | 410 | 510 | | |
| F19 | 1 | 440(broad) | 610 | | |
| F24 | 1 | 460 | 550 | 1 | VESICLE |
| F27 | 1 | 460 | 640 | | |
| F32 | 1 | 410 | 530 | | |
| F33 | 1 | 400 | 510 | | |
| F38 | 1 | 460 | 540 | | |
| F39 | 1 | 400-420 | 540 | | |
| F40 | 1 | 540 | 640 | | |
| G7 | 1 | 440 | 650 | 1 | MITO |
| G8 | 1 | 440 | 650 | 1 | MITO |
| G9 | 1 | 430 | 630 | 1 | MITO |
| G11 | 1 | 420-480 | 600 | | |
| G12 | 1 | 420-460 | 590 | 1 | MITO |
| G12 | | | | 2 | NUCLEOLI |
| G13 | 1 | 420 | 620 | | |
| G14 | 1 | 480(broad) | 620 | 1 | MITO |
| G15 | 1 | 420-460 | 560 | | |
| G16 | 1 | 430 | 560 | | |
| G18 | 1 | 430 | 670 | 1 | MITO |
| G19 | 1 | 500 | 670 | 1 | MITO |
| G20 | 1 | 490-540 | 670 | 1 | MITO |
| G21 | 1 | 450-550 | 670 | 1 | MITO |
| G23 | 1 | 450-500 | 610 | 1 | VESICLE |
| G24 | 1 | 490 | 610 | 1 | MITO |
| G27 | 1 | 450-550(broad) | 720 | 1 | MITO |
| G28 | 1 | 450 | 620 | | |
| G29 | 1 | 450 | 560 | | |
| G31 | 1 | 430 | 650 | 1 | MITO |
| G31 | | | | 2 | NUCLEOLI |
| G32 | 1 | 430 | 560 | 1 | MITO |
| G33 | 1 | 360-470 | 550 | 1 | MITO |
| G33 | | | | 2 | CYTO |
| G37 | 1 | 530 | 670 | | |
| G38 | 1 | 420 | 640 | 1 | VESICLE |
| G38 | | | | 2 | CYTO |
| G38 | | | | 3 | NUCLEI |
| G39 | 1 | 430 | 590 | | |
| G41 | 1 | 500 | 660 | | |
| H1 | 1 | 490, 530 | 640 | 1 | MITO |
| H2 | 1 | 480(weak) | 640 | | |
| H3 | 1 | 530 | 640 | 1 | MITO |
| H4 | 1 | 530 | 640 | | |
| H5 | 1 | 480 | 640 | | |
| H6 | 1 | 530 | 640 | | |
| H7 | 1 | 420 | 650 | | |
| H8 | 1 | 530 | 650 | | |
| H9 | 1 | 430 and 530 | 650 | 1 | MITO |
| H10 | 1 | 530 | 650 | 1 | MITO |
| H11 | 1 | 460 | 570 | | |
| H12 | 1 | 430 | 560 | 1 | VESICLE |
| H13 | 1 | 420 | 590 | | |
| I38 | 1 | 390 | 620 | 1 | CYTO |
| I39 | 1 | 380 | 500 | | |
| I41 | 1 | 480 | 630 | | |
| J1 | 1 | 450 | 620 | 1 | MITO |
| J3 | 1 | 450 | 620 | 1 | MITO |
| J6 | 1 | 400 | 520 | | |
| J9 | 1 | 420(broad) | 520 | 1 | MITO |
| J10 | 1 | 350-450 | 520 | 1 | MITO |
| J11 | 1 | 420 | 560 | | |
| J12 | 1 | 350-470 | 560 | 1 | VESICLE |
| J13 | 1 | 370, 420 | 590 | | |
| J14 | 1 | 420-480 | 580 | | |
| J15 | 1 | 340-440 | 530 | 1 | VESICLE |

TABLE 1-continued

The fluorescence and organelle targeting data for the compounds selected from the library

| COMPOUND LABEL | EX/EM PEAK NO. | EX(nm) | EM(nm) | LOCALIZATION NO. | LOCALIZATION |
|---|---|---|---|---|---|
| J16 | 1 | 350-460 | 530 | 1 | VESICLE |
| J19 | 1 | 480 | 640 | 1 | MITO |
| J20 | 1 | 420 | 620 | 1 | VESICLE |
| J23 | 1 | 430-460 | 570 | | |
| J24 | 1 | 420-500 | 560 | | |
| J27 | 1 | 460 | 670 | | |
| J31 | 1 | 400, 420 | 520 | 1 | MITO |
| J32 | 1 | 350-450 | 530 | 1 | MITO |
| J33 | 1 | 320-450 | 520 | 1 | MITO |
| J34 | 1 | 430 | 630 | | |
| J35 | 1 | 340-420 | 580 | 1 | CYTO |
| J36 | 1 | 420 | 540 | | |
| J37 | 1 | 550(broad) | 730 | 1 | ER |
| J38 | 1 | 380-500 | 590 | 1 | MITO |
| J39 | 1 | 350-450 | 560 | 1 | MITO |
| J40 | 1 | 400 | 580 | | |
| J41 | 1 | 460 | 630 | | |
| K9 | 1 | 400 | 510 | 1 | MITO |
| K10 | 1 | 420 | 500 | 1 | MITO |
| K12 | 1 | 390 (broad) | 530 | 1 | ER |
| K13 | 1 | 370 | 550 | | |
| K14 | 1 | 420 | 540 | 1 | MITO |
| K15 | 1 | 390 | 510 | | |
| K16 | 1 | 400 | 500 | | |
| K17 | 1 | 410 (broad) | 510 | 1 | ER |
| K19 | 1 | 460 | 580 | 1 | MITO |
| K23 | 1 | 460 | 550 | 1 | CYTO |
| K24 | 1 | 380-480 | 520 | 1 | MITO |
| K27 | 1 | 450(broad) | 630 | 1 | MITO |
| K30 | 1 | 410-480 | 610 | | |
| K32 | 1 | 320-440 | 510 | 1 | MITO |
| K33 | 1 | 320-460 | 510 | 1 | MITO |
| K34 | 1 | 450 | 610 | | |
| K36 | 1 | 410 | 520 | | |
| K37 | 1 | 490(broad) | 670 | 1 | VESICLE |
| K38 | 1 | 430 (broad) | 580 | | |
| K39 | 1 | 310-440(390) | 530 | 1 | MITO |
| K40 | 1 | 380 | 610 | | |
| L10 | 1 | 420 | 510 | 1 | MITO |
| L12 | 1 | 390 | 520 | 1 | ER |
| L13 | 1 | 380 | 540 | | |
| L14 | 1 | 420 (broad) | 570 | 1 | MITO |
| L14 | | | | 2 | ER |
| L15 | 1 | 390 | 570 | | |
| L16 | 1 | 390 | 500 | | |
| L17 | 1 | 420 | 500 | 1 | ER |
| L19 | 1 | 450 | 580 | 1 | MITO |
| L23 | 1 | 420 | 570 | 1 | CYTO |
| L24 | 1 | 430 | 500 | | |
| L27 | 1 | 430 | 620 | | |
| L32 | 1 | 400(broad) | 520 | 1 | MITO |
| L33 | 1 | 360-470 | 500 | 1 | MITO |
| L35 | 1 | 420 | 510 | 1 | MITO |
| L37 | 1 | 480 | 680 | | |
| L38 | 1 | 420 | 570 | | |
| L39 | 1 | 390 | 510 | | |
| L40 | 1 | 380 | 620 | | |
| M12 | 1 | 400 | 520 | 1 | ER |
| M13 | 1 | 380 | 540 | | |
| M14 | 1 | 420(broad) | 540 | 1 | MITO |
| M15 | 1 | 390 | 510 | | |
| M17 | 1 | 410 | 510 | 1 | ER |
| M19 | 1 | 450 | 590 | 1 | MITO |
| M23 | 1 | 420 | 540 | 1 | CYTO |
| M24 | 1 | 430 | 520 | | |
| M27 | 1 | 440(broad) | 620 | 1 | MITO |
| M30 | 1 | 430 | 600 | | |
| M32 | 1 | 390(broad) | 510 | 1 | MITO |
| M33 | 1 | 320-440 | 500 | 1 | MITO |

TABLE 1-continued

The fluorescence and organelle targeting data for the compounds selected from the library

| COMPOUND LABEL | EX/EM PEAK NO. | EX(nm) | EM(nm) | LOCALIZATION NO. | LOCALIZATION |
|---|---|---|---|---|---|
| M37 | 1 | 520 | 685 | | |
| M38 | 1 | 430 | 580 | | |
| M39 | 1 | 390 | 520 | 1 | MITO |
| M40 | 1 | 460 | 620 | | |
| N4 | 1 | 420 | 610 | | |
| N19 | 1 | 580(broad) | 680 | 1 | NUCLEOLI |
| N20 | 1 | 580(broad) | 670 | 1 | NUCLEOLI |
| N21 | 1 | *420 | 610 | | |
| N24 | 1 | 540 | 590 | 1 | CYTO |
| N30 | 1 | 550 | 590-700 | | |
| N31 | 1 | 380 | 600 | | |
| N37 | 1 | 470 | 540 | 1 | MITO |
| N37 | 2 | 530, 360 | 730 | 2 | NUCLEOLI |
| N38 | 1 | 490 | 620 | | |
| 27 | 1 | 430 | 570 | 1 | GRANULE |
| 34 | 1 | 450 | 550 | 1 | GRANULE |

Table 2 shows the emission colors of the fluorescent compounds from the components from the styryl dye library of the present invention. Column a shows the components in building block A, while column b shows the components in building block B.

TABLE 2

The emission colors of the fluorescent compounds from the Styryl dye library
(a: the components in building block A; b: the components in building block B).

TABLE 2-continued

The emission colors of the fluorescent compounds from the Styryl dye library
(a: the components in building block A; b: the components in building block B).

The compounds of the present invention can be used for organelle detection without further purification.

Figure 1:
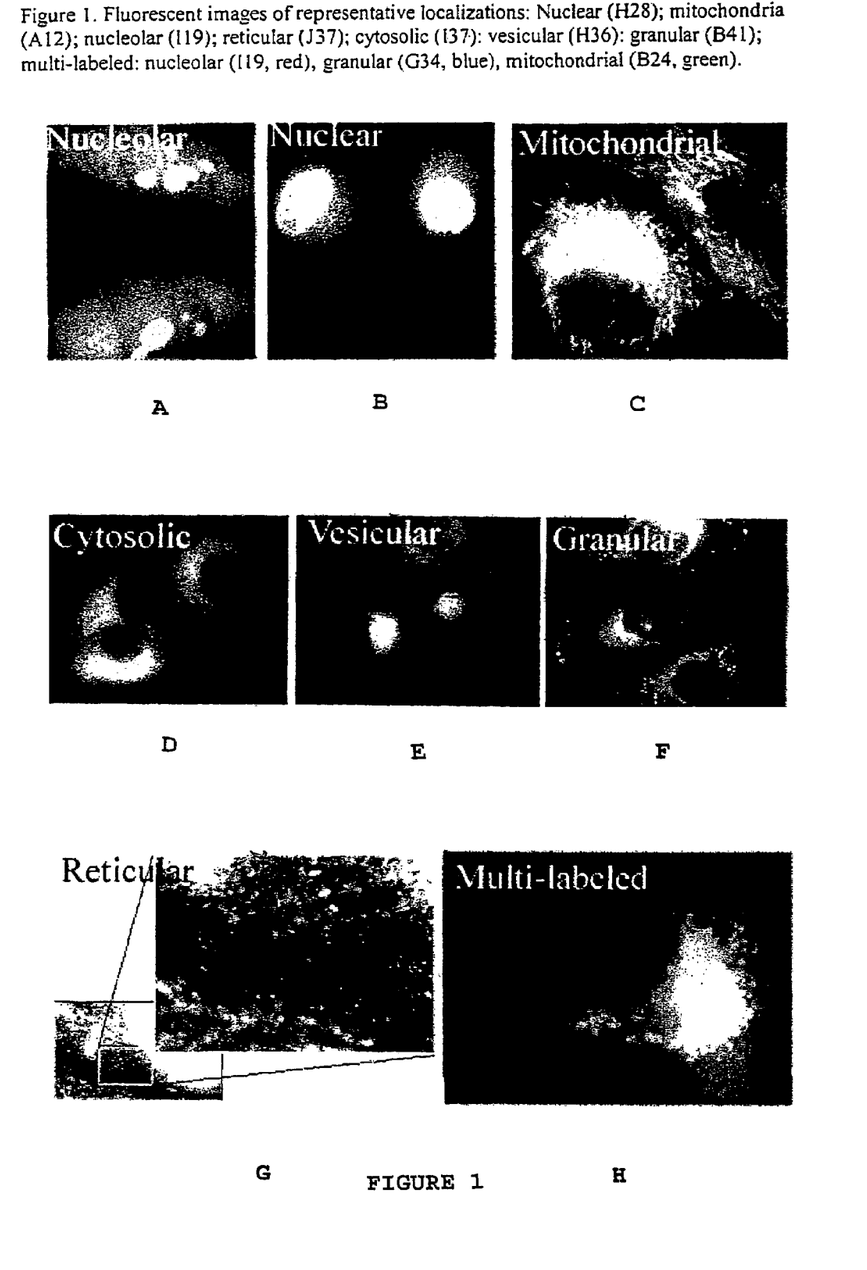
FIG. 1 shows fluorescent images of representative localizations.

To obtain the results shown in FIG. 1, the library compounds were incubated with live UACC-62 human melanoma cells growing on glass bottom 96-well plates, and the localizations of the different compounds in the cells were determined using an inverted fluorescence microscope ($\lambda_{ex}$=405, 490, and 570 nm; $\lambda_{em}$>510 nm) at 1000× magnification. It was found that 119 out of 270 fluorescent compounds bind to specific organelles, such as mitochondria, ER (endoplasmic reticulum), vesicles, nucleoli, chromatin, cytoplasm, or granules.

The photographs of fluorescent images in FIG. 1 show the locations of selected compounds obtained by fluorescence microscopy. Previous studies have established that there is a large voltage difference between the inside of the mitochondria and the cytosol and compounds with storing polarizability and charged compounds can interact strongly with the mitochondrial membrane. Since the library compounds are positively charged, it is not surprising that 645 out of 119 selected compounds were found to bind specifically to mitochondria.

Owing to the diversity of molecular structure, some compounds targeted organelles other than mitochondria. This encrypted interesting Structure-Localization Relationship (SLR), which can lead to rational design of molecular probes for cellular components, which opened the change for multi-color labeling using the fluorescent toolbox of the present invention.

Table 3 shows the localization distribution of the organelle specific styryl dyes of the present invention:

TABLE 3

The localization distribution of the organelle specific styryl dyes (❖: nucleolar; : nuclear; ♦: mitochondria; ●: cytosolic; x: endoplasmic reticular (ER); ■: vesicular; ▲: granular).

|    | A   | B    | C   | D | E  | F | G | H   | I    | J | K   | L    | M | N |
|----|-----|------|-----|---|----|---|---|-----|------|---|-----|------|---|---|
| 1  | ●   | ●    |     |   |    |   |   | ♦   | ♦    | ♦ |     |      |   |   |
| 3  |     |      |     |   |    |   |   | ♦   | ♦    | ♦ |     |      |   |   |
| 4  |     |      |     |   |    |   |   |     | ▲    |   |     |      |   |   |
| 7  |     |      |     |   |    |   | ♦ |     |      |   |     |      |   |   |
| 8  |     |      |     |   |    |   | ♦ |     |      |   |     |      |   |   |
| 9  |     |      |     |   |    |   | ♦ | ♦   |      |   | ♦   | ♦    |   |   |
| 10 |     |      |     |   |    |   |   | ♦   | ■●   | ♦ | ♦   | ♦    | ♦ |   |
| 11 |     | ♦    |     |   |    |   |   |     |      |   |     |      |   |   |
| 12 | ♦   |      | ♦ x |   | x■ |   | ♦* | ■  | ■    | ■ | x   | x    | x |   |
| 14 | ♦   |      | x   |   |    |   | ♦ | ■   | ■    |   | ♦   | ♦ x  | ♦ |   |
| 15 |     |      |     |   |    |   |   | ♦   |      |   | ■   |      |   |   |
| 16 |     | ♦    |     |   |    |   |   | *   | ■*   | ■ |     |      |   |   |
| 17 |     |      |     |   |    |   |   | ■*  | ■    |   | x   | x    | x |   |
| 18 |     |      |     |   |    |   | ♦ | ♦*  | *    |   |     |      |   | * |
| 19 | ♦ * | ♦ x  | ♦   |   | ♦  |   | ♦ | *   | *    | ♦ | ♦   | ♦    | ♦ | * |

TABLE 3-continued

The localization distribution of the organelle specific styryl dyes (◆: nucleolar; : nuclear; ◆: mitochondria; ●: cytosolic; x: endoplasmic reticular (ER); ■: vesicular; ▲: granular).

| | A | B | C | D | E | F | G | H | I | J | K | L | M | N |
|---|---|---|---|---|---|---|---|---|---|---|---|---|---|---|
| 20 | | | | | | | ◆ | * | * | ■ | | | | * |
| 21 | | | | | | | ◆ | ◆* | ■* | | | | | |
| 22 | | ◆ | | | | | | | | | | | | |
| 23 | ◆● | ● | | ● | ● | ● | | ■ | ■* | | | ● | ● | ● |
| 24 | ● | ◆ | ● | | | | | ■ | ◆ | ● | | | ◆ | ● |
| 25 | | | ● | | | | | | | | | | | |
| 27 | ▲ | ● | ◆x | | | | ◆ | ◆ | * | | ◆ | | ◆ | |
| 28 | | | | | | | | ◆ | * | | | | | |
| 30 | | | | | | | | | ◆ | | | | | |
| 31 | | | ◆ | | | | ◆* | ◆◆ | ◆◆● | ◆ | | | | |
| 32 | ◆●■ | ◆ | | | | | ◆ | ◆* | ◆◆* | ◆ | ◆ | ◆ | ◆ | ◆ |
| 33 | ◆●■ | | | | | | ◆● | ◆◆●■ | ◆◆■ | ◆ | ◆ | ◆ | ◆ | ◆ |
| 34 | ▲ | | | | | | | | | | | | | |
| 35 | | | | | | | | ● | ● | | ◆ | | | |
| 36 | | ◆ | | | | | | | | | | | | |
| 37 | | ◆ | | | ◆ | ◆* | | | ● | x | ■ | | | ◆* |
| 38 | | ◆◆ | | | | | ■●◆ | | ● | ◆ | | | | |
| 39 | | ◆ | | | | | | ● | | ◆ | ◆ | | ◆ | |

Table 4 shows the localization and color distribution of the organelle specific styryl dyes

TABLE 4

The localization and color distribution of the organelle specific styryl dyes.

| Color-wavelength | MITO | GRAN | VESICLE | ER | NUCLEOLI | NUCLEI | CYTO |
|---|---|---|---|---|---|---|---|
| 700-730 | 2 | | | 1 | | | 1 |
| | 4 | | 1 | | 3 | | |
| | 20 | 1 | 2 | | 7 | | 2 |
| | 9 | | 2 | | | | 3 |
| 560-580 | 2 | 1 | 3 | | | | 5 |
| | 6 | 2 | | 1 | | 1 | 2 |
| | 21 | | 3 | 7 | | | 5 |
| | | | | | | | 1 |
| | | | | | | | 1 |
| | 64 | 4 | 11 | 9 | 10 | 1 | 20 |

In UACC-62 human melanoma cell screening, only 8 out of 855 compounds showed a strong nuclear localization. The eight compounds were resynthesized in large scale for further study. The synthesis of methyl pyridium compounds was prepared by refluxing with the pyridine derivatives and iodomethan for 2 hr. Methyl pridium compound crystallized out in ethyl acetate. The condensation with aldehydes and methyl pyridium compound was performed by refluxing with piperidine for 2 hr in EtOH. After the mixture was cooled to room temperature, the crystallized compounds were filtered and washed with ethyl acetate.

Figure 3:
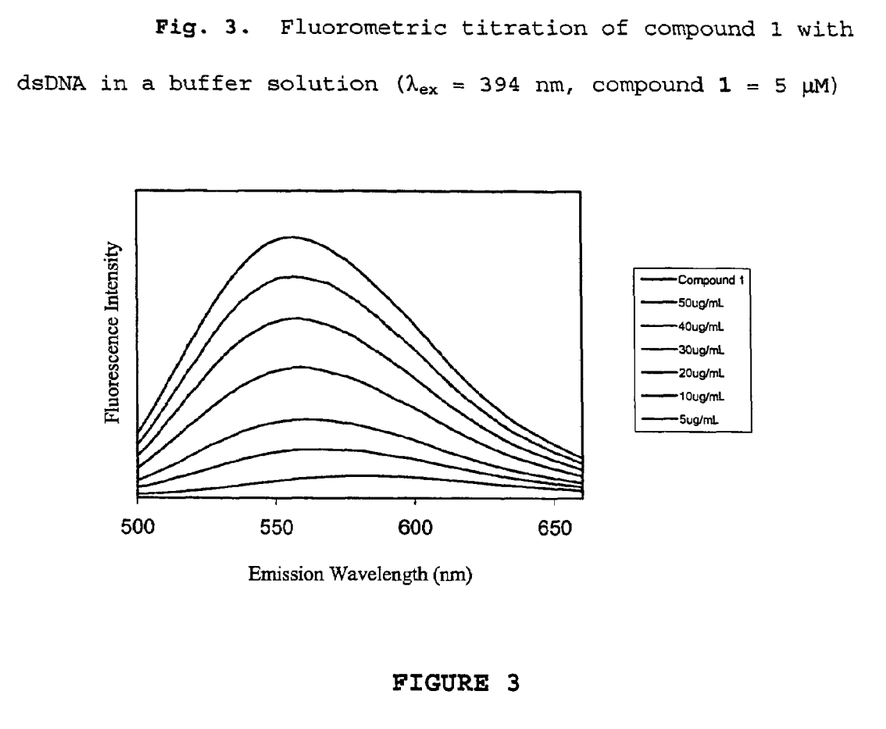
FIG. 3 shows fluorometric titration of compound 1 in a solution.
Figure 4:
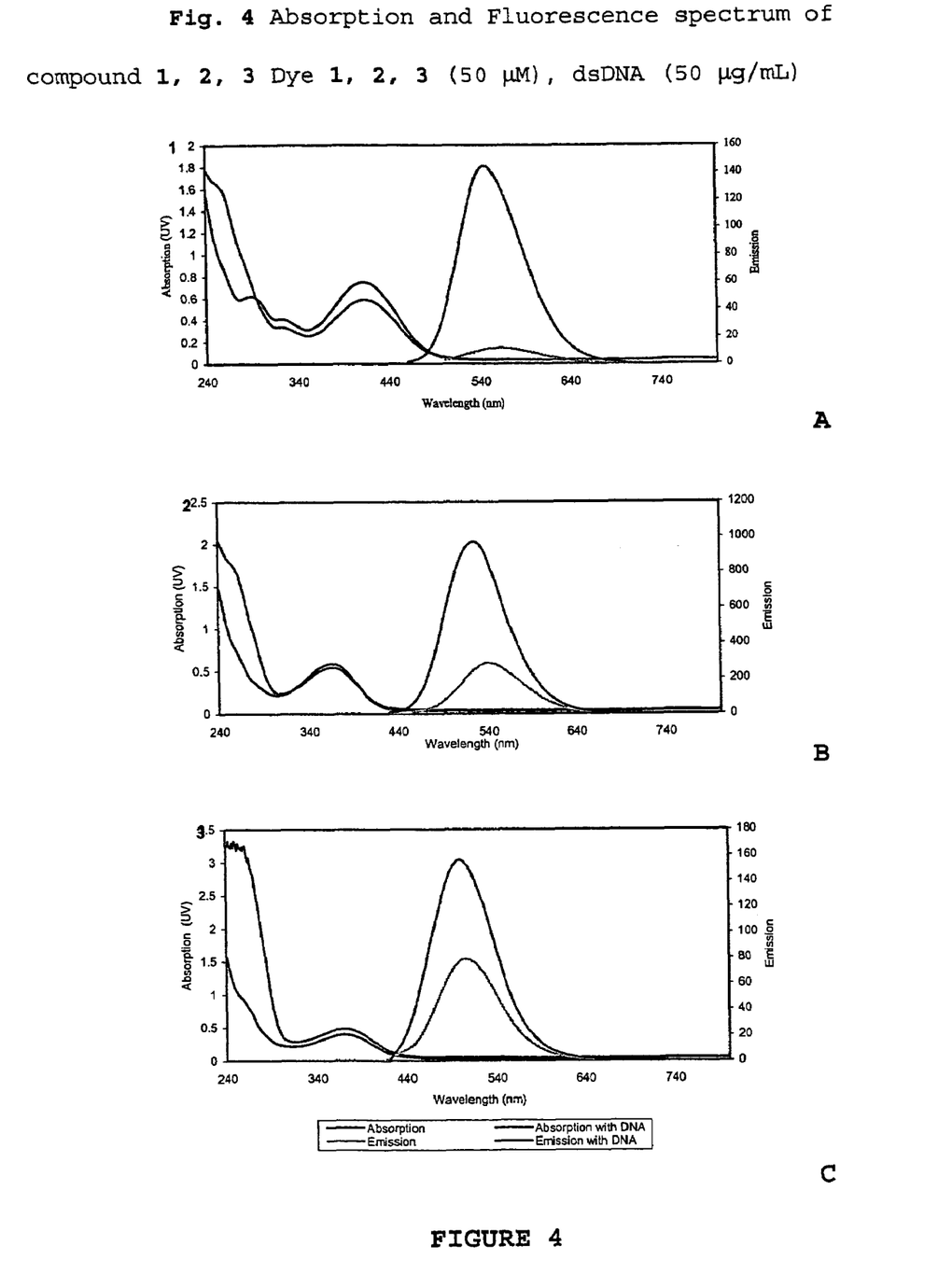
FIGS. 4A-4C show the absorption and fluorescence spectrum of compounds and dyes.

With these compounds(FIG. 2), we observed the fluorescence intensity change upon addition of DNA. Only compound 1 showed a strong fluorescence increase. Compound 1 is an orange solid that exhibits an excitation wavelength of $\lambda=413$ nm and an emission wavelength of $\lambda=583$ nm (Table 5). A linear fluorescence response was observed in the 0.05-100 μM range (in PBS: phosphate-buffered saline) without self-quenching or shifts in emission or excitation wavelengths. With a series of concentrations of dsDNA (double stranded DNA) added to compound 1, a linear increase in the fluorescence intensities was observed (FIG. 3). At the highest concentration of DNA tested (50 μg/mL), the increase in fluorescence emission reached up to 13.3 times higher than that of the free compound (FIG. 4). A blue shift of 17 nm in the emission wavelength upon DNA addition was observed, without a significant excitation wavelength shift. The structure of compound 1 includes a 2,4,5-trimethoxy group from the benzaldehyde moiety and a unique adamantyl pyridinium functionality.

Figure 2:
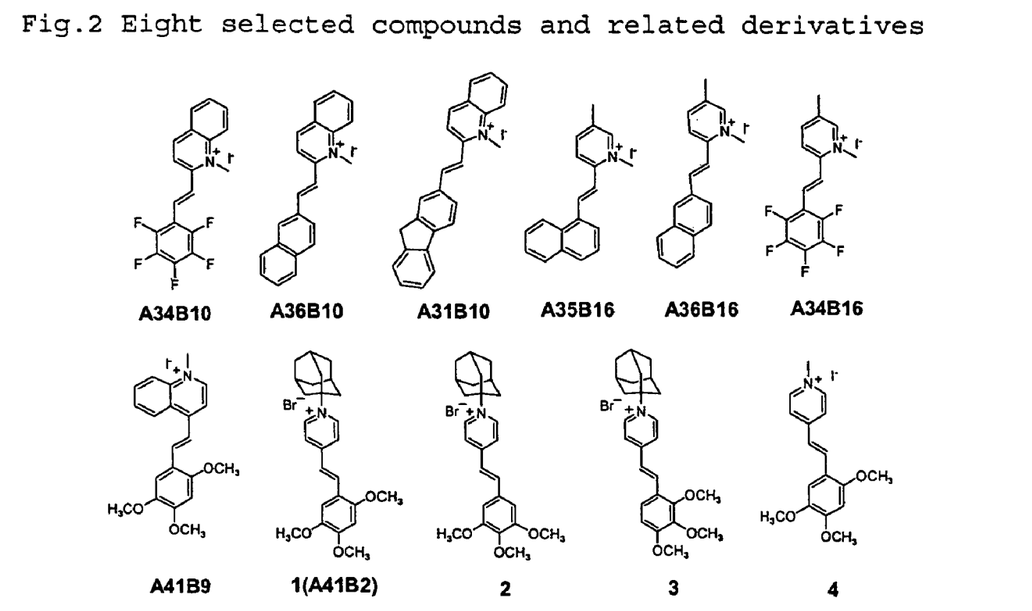
FIG. 2 shows eight selected compounds and their related derivatives.

Different trimethoxy isomers, 2 (3,4,5-trimethoxy) and 3 (2,3,4-trimethoxy) were synthesized to compare the positional effects of the methoxy groups in compound 1 (FIG. 2). While the responses of compound 2 and 3 to DNA treatment were simliar to that of compound 1, the fluorescence emission increase was much smaller in compound 2 (4.3 fold) and compound 3 (1.5 fold). It is noteworthy that the intrinsic fluorescence intensity of compounds 2 or 3 is higher than that of compound 1, but DNA treated samples showed comparable quantum yields (Table 5).

Compound 4 was also resynthesized and tested to study the structural importance of the adamantyl group in compound 1.

Interestingly, the simple exchange of the adamantyl with a methyl group significantly reduced the DNA response in compound 4. Therefore, it appears that both 2,4,5-trimethoxy groups and the adamantyl group are important in the specific interaction of compound 1 and DNA.

Figure 5:
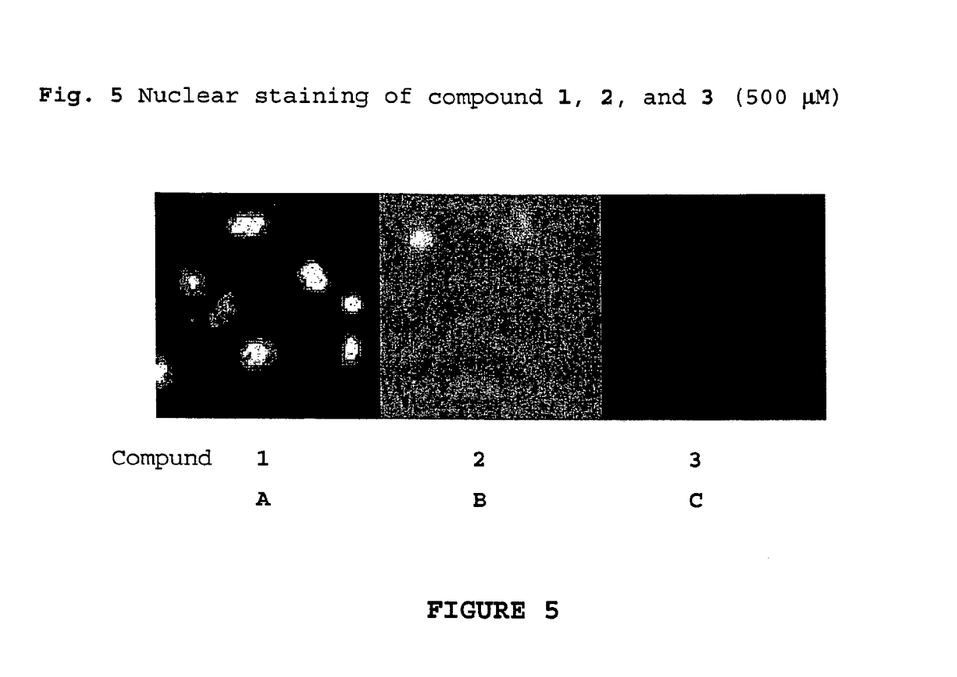
FIG. 5A-5C show nuclear straining of compounds 1, 2, and 3, respectively.

The three related compounds 1, 2, and 3 were incubated in live UACC-62 human melanoma cells to compare the nuclear localization properties (FIG. 5). In comparison to compound 1 in the same concentration, compounds 2 and 3 showed stronger fluorescence backgrounds and spread throughout the cytoplasm. However, compound 1 clearly shows more selective staining of the nucleus of live cells.

TABLE 5

Spectrophotometric properties of the styryl dyes

| Dye | $\lambda_{max}$ (nm) | $\lambda_{em}^{free}$ (nm) | $\lambda_{em}^{DNA}$ (nm) | $\phi_F^{free}$ | $\phi_F^{DNA}$ | $\phi_F^{DNA}/\phi_F^{free}$ |
|---|---|---|---|---|---|---|
| Compound 1 | 413 | 583 | 566 | 0.00024 | 0.0032 | 13.3 |
| Compound 2 | 366 | 553 | 520 | 0.0051 | 0.022 | 4.3 |
| Compound 3 | 370 | 491 | 502 | 0.0024 | 0.0037 | 1.5 |

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

REFERENCES

1. Fox, Acc. Chem. Res. 1999, 32, 201-207.
2. Combinatorial Chemistry-Synthesis, Analysis, Screening; Jung; Wiley-VCH:Weinheim, Germany, 1999.
3. (a) Jaramillo, et al., W. J. Comb. Chem. 2002, 4, 17-22. (b) Combinatorial Materials Development; Malhotra; American Chemical Society: Washington D.C., 2000. (c) Sun, et al., Adv. Mater. 1997, 9, 1046-1049. (d) Wang, et al., Science, 1998, 279, 1712-1714.
4. (a) Fluorescent Chemosensors for Ion and Molecule Recognition; Czarnik; American Chemical Society: Washington D.C., 1992. (b) Applied Fluorescence in Chemistry, Biology and Medicine; Retting, et al., Seifert H. Eds.; Springer: New York, 1999. (c) Slavik, Fluorescent Probes in Cellular and Molecular Biology; CRC: An Arbor, 1993
5. (a) Lakowicz, Principles of Fluorescence Spectroscopy; Kluwer Academic/Plenum Publishers: New York, 1999. (b) Herman, Fluorescence Microscopy, $2^{nd}$ Ed; Springer: New York, 1998.
6. (a) Schidel, et al., Agnew. Chem. Int. Ed. 2001, 40, 4677-4680. (b) Zhu, et al., Tetrahedron Lett. 2002, 43, 5083-5086. (c) Lavastre, et al., J. Am. Chem. Soc. 2002, 124, 5278-5279.
7. Brown, et al., J. Chem. Soc. 1965, 3770-3778.
8. Matusui, et al., Bull. Chem. Soc. Jpn., 1992, 65, 71-74.

What is claimed is:

1. Compounds selected from the group consisting of wherein X is selected from the group consisting of Cl, Br, I, cyanide, cyanate, thiocyanate, selenocyanate, and azide;

$R_1$, $R_2$, $R_3$, $R_4$ and $R_5$ are the same or different and are selected from the group consisting of hydrogen, fluorine and methoxy.

2. The compound according to claim 1 having the following formula:

wherein X is selected from the group consisting of Cl, Br, I, cyanide, cyanate, thiocyanate, selenocyanate, and azide.

3. A method of detecting DNA and RNA comprising incubating cells in the presence of a compound according to claim 2 and detecting fluorescence emissions.

* * * * *